May 7, 1968     G. WADE ET AL     3,382,454
LOW LOSS INJECTION LASER
Filed Nov. 12, 1963     2 Sheets-Sheet 1
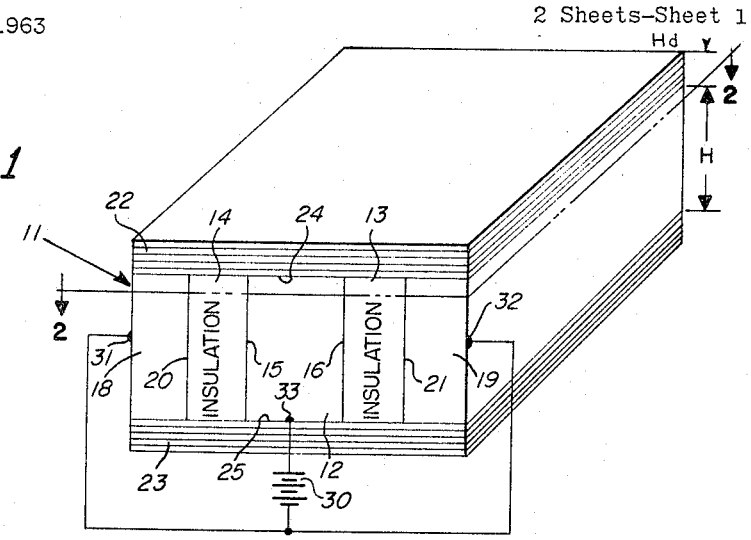
FIG. 1
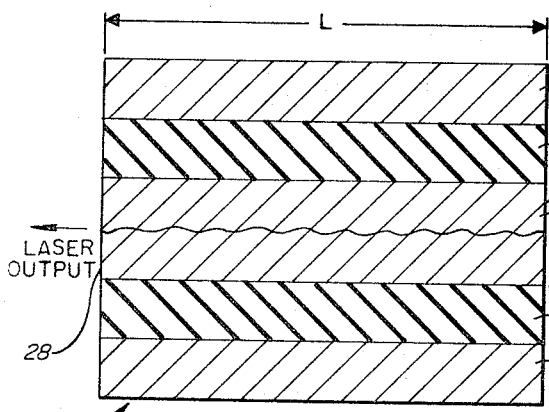
FIG. 2
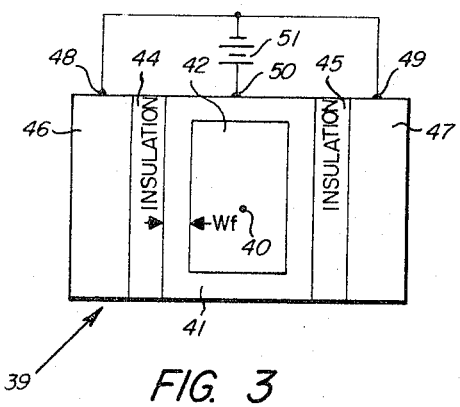
FIG. 3
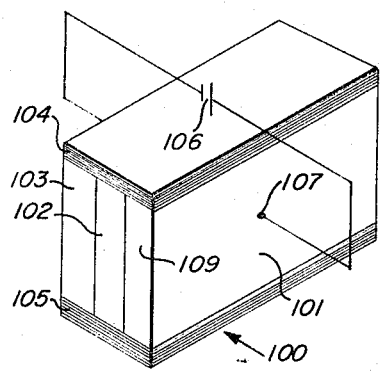
FIG. 10
FIG. 11
INVENTORS
GLEN WADE
SAMUEL R. STEELE
WOLFGANG M. FEIST
BY Donald Brown
AGENT May 7, 1968   G. WADE ET AL   3,382,454
LOW LOSS INJECTION LASER
Filed Nov. 12, 1963   2 Sheets-Sheet 2
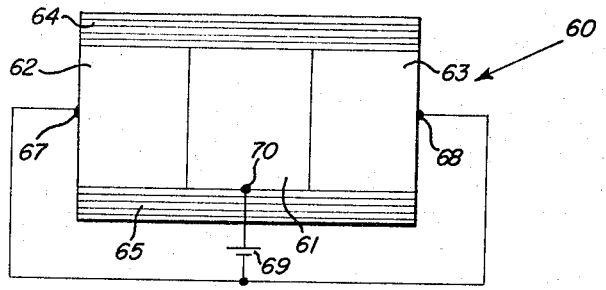
FIG. 4
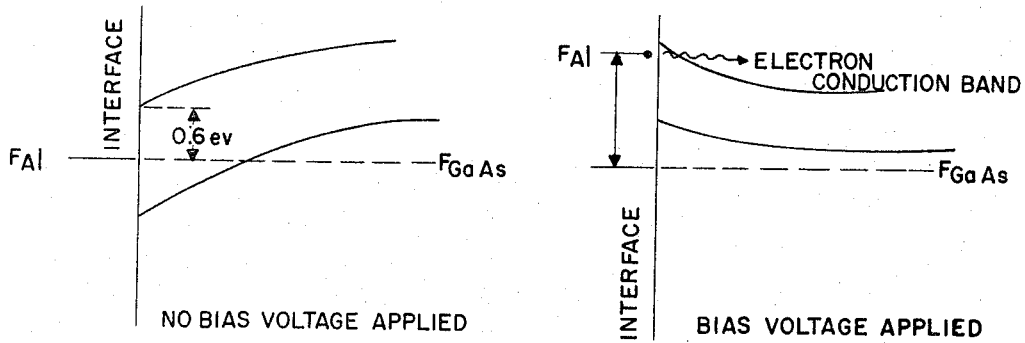
NO BIAS VOLTAGE APPLIED
FIG. 5
BIAS VOLTAGE APPLIED
FIG. 6
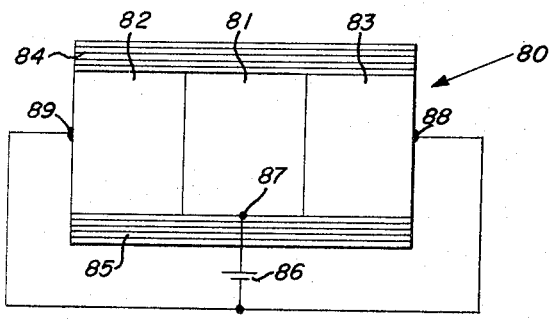
FIG. 7
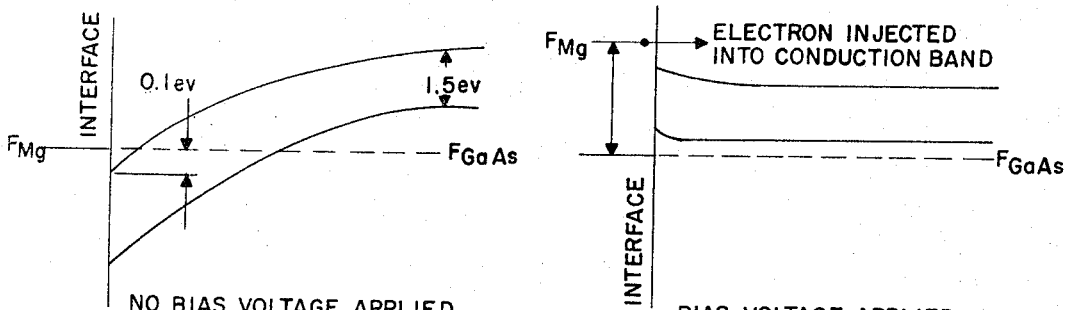
NO BIAS VOLTAGE APPLIED
FIG. 8
BIAS VOLTAGE APPLIED
FIG. 9
INVENTORS
GLEN WADE
SAMUEL R. STEELE
WOLFGANG M. FEIST
BY
Donald Brown
AGENT United States Patent Office 3,382,454
Patented May 7, 1968

3,382,454
LOW LOSS INJECTION LASER
Glen Wade, Ithaca, N.Y., and Samuel R. Steele, Sudbury, and Wolfgang M. Feist, Burlington, Mass., assignors to Raytheon Company, Lexington, Mass., a corporation of Delaware
Filed Nov. 12, 1963, Ser. No. 322,965
8 Claims. (Cl. 331—94.5)

This invention relates to solid state semiconductor lasers and, more particularly, to solid state semiconductor injection lasers.

In the past, injection lasers have been constructed in a diode configuration and comprise P and N layers which contact each other at a junction. Forward biasing of the junction produces hole-electron pairs within the junction region between said layers and in the near vicinity of the junction region. These electrons and holes subsequently recombine and produce a resultant emission of photons of characteristic wavelength. An optical cavity is required which consists of suitable reflecting surfaces, positioned about the junction.

One of the problems presented by the typical P–N junction device is the high loss which occurs in both the P and N type neutral regions surrounding the junction region. High photon absorption is known to occur, particularly in the N type material and is believed to provide much of the loss of the device. Additional losses also take place in the P type material.

Accordingly, it is the principal objective of this invention to reduce the high losses characteristic of the material on one side of the P–N junction.

It is a further object of this invention to confine the photon field to the recombination region.

It is another object of this invention to provide an injection laser of the semiconductor type which avoids the use of a diode configuration with a P–N junction.

It is an additional object of this invention to provide an injection laser which relies upon the injection of electrons into a degeneratively doped P type material.

In accordance with this invention, carriers are injected by means of a tunneling phenomenon from a suitable provider of carriers into a recombination region of semiconductor material. The recombination region is appropriately provided with a pair of parallel, highly reflective surfaces. Recombination and photon emission then takes place between the reflective surfaces and radiation is extracted in the conventional laser fashion from one of the reflective surfaces. More particularly, electrons are injected from a metal into a P type degeneratively doped region, thereby producing recombination radiation. This radiation, due to the setting up of standing waves between approximately positioned Fabry-Perot surfaces, produces a mode of oscillation which is then extracted in a conventional manner from one of the Fabry-Perot surfaces.

This invention will be better understood from the following more detailed description taken in conjunction with the accompanying drawings wherein:

FIG. 1 illustrates a plan view of an embodiment utilizing the injection of tunneling electrons through an insulation into a degeneratively doped region;

FIG. 2 is a section of FIG. 1 along line 2—2;

FIG. 3 is a front elevational view of another embodiment of this invention utilizing the injection of tunneling carriers through an insulator and a thin metal jacket prior to their recombination within a degeneratively doped region;

FIG. 4 is a front elevational view of an injection laser relying on the injection of carriers from an aluminum film directly into a degeneratively doped semiconductor region;

FIG. 5 is a pictorial representation of the Fermi levels and energy band picture of the device of FIG. 4 with no bias applied;

FIG. 6 is a pictorial representation of the Fermi levels and energy band picture of the device of FIG. 4 with a bias voltage applied;

FIG. 7 is a front elevation of a metal-to-degeneratively doped semiconductor region injection laser utilizing metal regions which have a work function which is lower than the infinity of the semiconductor region;

FIG. 8 is a pictorial representation of the Fermi levels and the energy band picture of the device of FIG. 7 with no bias applied;

FIG. 9 is a pictorial representation of the Fermi levels and the energy band picture of the device of FIG. 7 with the bias voltage applied;

FIG. 10 is a plan view of cylindrical configuration injection laser; and

FIG. 11 is a plan view of a single metal-single insulation-semiconductor region injection laser according to this invention.

Referring now to FIGS. 1 and 2, there is disclosed an injection laser 11 comprised of a degeneratively doped gallium arsenide P region 12. On two of the faces 15 and 16 of the region 12 is mounted an insulator material 13 and 14, respectively. The insulator material is preferably of $Al_2O_3$, $SiO_2$ or $SiO$ material. At the surfaces 20 and 21 of the insulator materials 13 and 14, respectively, metal regions 18 and 19 of aluminum material are positioned in contact with the insulator regions. Positioned on the top and bottom surfaces of this sandwich formation of the metal, insulation and semiconductor regions are two multi-layer dielectric sandwiches 22 and 23.

The dielectric sandwiches 22 and 23 are comprised of alternate layers of a low index of refraction material, such as $MgF_2$, and a high index of refraction material, such as GaAs, each layer having a thickness of $\frac{1}{4}\lambda$ at the lasering frequency. The bottom or first layer of the sandwich in contact with metal, insulation and semiconductor region is the low index of refraction region $MgF_2$. Multi-layer dielectric sandwiches are used to improve the reflectivity of laser materials so as to prevent photon energy from leaving the recombination regions. An article entitled, "Applications of the Interference of Light in Thin Film," by P. M. van Alphen, describing these materials, can be found in Philips Technical Review, published in the Netherlands, vol. 19, August 1957, pages 59–67, inclusive.

Forward biasing is provided between the outer metal regions 18 and 19 by connecting a battery 30, for example, in the order of 5 volts, to these regions by ohmic contacts 31 and 32. The semiconductor region 12 is ohmically connected at point 33 to the battery 30 to complete the circuit, thus permitting tunneling of electrons from the outer metal regions through the insulation into the degeneratively doped P region. The device 11 has an approximate length dimension L of 1 millimeter. It has an approximate height dimension H between the dielectric sandwiches of ½ millimeter. The degenerative gallium arsenide P region 12 has a width dimension in the order of 1 micron. The insulator materials 13 and 14 have a width dimension of approximately 50 to 60 angstroms. The outer metal regions 18 and 19 have width dimensions in the order of 1,000 angstroms. The dielectric regions 22 and 23 are comprised of approximately 11 to 14 alternate $MgF_2$ and GaAs layers having a height dimension H$d$ of approximately 1 micron. The gallium arsenide degeneratively doped region is comprised of gallium arsenide plus an impurity such as zinc which is utilized to degeneratively dope this region. Other dopants, such as cadmium or Hg may also be used. Degeneratively doped P-type GaAs is defined as GaAs having a Fermi level below its valence band. (See, for example, the text "Semi-conductors," edited by M. B. Hanay in 1959 and published by Reinhold Publishing, Inc.) Other materials from the following class could be utilized as region 12: GaP, CdS and InP. Furthermore, silver and gold could be substituted in place of aluminum as the metal regions 18 and 19. Additionally, in place of aluminum, beryllium and tantalum could be used with beryllium oxide and tantalum oxide, insulator regions, respectively.

In order to provide for reflection of the photon oscillations, end surfaces 28 and 29 (FIG. 2) of the degeneratively doped region 12 are polished with an abrasive. Other methods of providing reflections at these surfaces could comprise coating these surfaces with a metal such as silver. By providing these reflective surfaces, a Fabry-Perot cavity is thus formed.

The theory of operation is as follows: Electrons are injected into region 12 from the metal regions 18 and 19 by quantum-mechanical tunneling which takes place across the insulators 13 and 14, respectively. The tunneling electrons pass into the semi-conductor degeneratively doped region to populate its conduction band. These electrons constitute the inverted population. This inverted population gives rise to hole electron recombination and subsequent production of photons of infrared energy at wavelengths of approximately 9,000 angstroms. As a result of the reflective ends and the cavity formed by the interfaces provided by the insulation and the dielectric layers, a mode of oscillation along the lengthwise dimension of the gallium arsenide degeneratively doped region is produced. After a period of time, a sufficient build up of coherent light energy is produced by reinforcements from the reflective surfaces. At this time, a lasering action takes place as the energy escapes from the face 28 due to that face being slightly less reflective than face 29.

Thus, there has been disclosed an injection laser of the semiconductor type which does not rely upon the injection of carriers across a P-N junction. This then permits a device to be constructed having low losses due to the reduction of losses which normally occur in the N-type region of the presently available injection semiconductor lasers. It is also to be understood that the interfaces of the device of FIG. 1, with the degeneratively doped region 12, are not of the P-N rectifying type as is the prior art. In addition, this structure of FIG. 1 discloses a structure which, due to the configuration of FIG. 1, provides a means of confining the lasering field to the region in which recombination is taking place.

In FIG. 3, there is disclosed another embodiment of this invention utilizing the injection of tunneling carriers through an insulation into a highly reflecting metal film 41 and subsequently into the degeneratively doped recombination region, thus, the space of the lasering region of the device of FIG. 3 is confined by the highly reflective metal walls. More particularly, the injection laser 39 of FIG. 3 comprises a degeneratively doped region 42 of gallium arsenide doped with zinc coated on four surfaces with a metallic film, such as silver or aluminum. The metal film has thickness or width dimension $W_f$ less than about 100 angstroms. As in the embodiment of FIG. 1, the device of FIG. 3 has the insulations 44 and 45 and the outer metal regions 46 and 47. Forward biasing is provided to this structure by a battery 51 coupled ohmically to regions 46 and 47 at contacts 48 and 49 and metallic film region 41 ohmically coupled to the battery 51 at contact 50. The device of this structure operates similarly as that of the structure disclosed in FIG. 1. Electrons from the metal regions 46 and 47 tunnel through the insulation and pass from the metal substrates 46 and 47 into the positively biased metal film. The tunnel electrons show up as hot electrons, that is, high energy electrons and pass into the semiconductor region 42 to populate its conduction band. These electrons constitute the inverted population. Infrared energy, due to recombination region 42, is then provided at the face 40 which acts as one end of a parallel Fabry-Perot mirror.

In FIG. 4, there is disclosed a metal semiconductor barrier injection laser device 60 in accordance with this invention. In this embodiment, the reflecting metal is brought in direct contact with the degeneratively doped P-type semiconductor. Device 60 comprises a degeneratively doped P region 61 covered on two surfaces by metal regions 62 and 63. The P-type region is preferably of gallium arsenide and the metal regions 62 and 63 are preferably comprised of aluminum. Covering two other surfaces of the gallium arsenide region 61 are two multi-dielectric layers 64 and 65. Biasing of this device is provided by a voltage source 69 which is ohmically connected to region 61 at point 70 and is connected ohmically to metal regions 62 and 63 by contacts 67 and 68, respectively. It is assumed that in this embodiment, the electron affinity of the semiconductor is smaller than the work function of the metal and provides the energy band situation shown in FIG. 5. The definition of the affinity of a semiconductor is disclosed on page 144 of the book "Physical Electronics," by Robert L. Ramey, published in 1961 by the Wadsworth Publishing Company, Inc., Belmont, California wherein: "The quantity $x$ is the energy difference between the vacuum level and the bottom of the conduction band in the semiconductor." This is the definition for the electron affinity of a semiconductor.

FIG. 5 discloses the energy band diagram for the aluminum to gallium arsenide interface for the device of FIG. 4 with no bias voltage applied. The barrier height is of the order of .6 ev. Also, on account of the degenerative doping, the width of the barrier is so narrow that significant tunneling can occur through the barrier with small bias voltage applied.

FIG. 6 depicts the situation of a positive bias voltage applied by voltage source 69 to permit the injection of electrons into the conduction band of the gallium arsenide by quantum-mechanical tunneling. $F_{al}$ and $F_{GaAs}$ represent the Fermi levels for aluminum and gallium arsenide with no bias voltage applied as shown in FIG. 5 and with a bias voltage applied as shown in FIG. 6. The device of FIG. 4 operates in the same manner as disclosed with relationship to the device of FIG. 1. The lasering field is confined by the multi-layers 64 and 65 and the metallic regions 62 and 63. Forward biasing raises the Fermi level of the aluminum and bends the gallium arsenide energy bands upward as shown in FIG. 6, thereby permitting injection of electrons from the aluminum into the gallium arsenide.

Referring now to FIG. 7, there is disclosed a similar structure to that of FIG. 4. However, the reflecting metal, which is in direct contact with the degeneratively doped region, is now chosen to have a work function which is smaller than the affinity of the semiconductor. This permits electrons to be directly injected into the semiconductor without having to tunnel through a barrier. The device of FIG. 7, shown as 80, is comprised of a degeneratively doped P-type gallium arsenide region having mounted on two surfaces magnesium reflecting regions 82 and 83. Covering the reflecting regions and the degeneratively doped region are two multi-layer dielectric regions 84 and 85. Forward biasing is supplied by a voltage source 86 which is ohmically connected to region 81 at point 87 and is ohmically connected at its negative terminal to regions 82 and 83 at contacts 89 and 88, respectively. Other metals which could be substituted in place of magnesium and which have a sufficiently low work function and very good reflectivity are beryllium, thallium and thorium.

FIG. 8 represents the energy band relationship at the interface between magnesium and gallium arsenide with no bias voltage applied.

FIG. 9 represents the energy band relationship at the interface between magnesium and gallium arsenide with the bias voltage applied. FIG. 9 shows electrons being directly injected into the conduction band of the degeneratively doped gallium arsenide region, thus, providing an inverted population so as to stimulated lasering and the subsequent emission of infrared radiation.

It is to be realized that the device of FIG. 4 and FIG. 7 utilize parallel mirrored surfaces of the Fabry-Perot type in order to provide for lasering.

In FIG. 10, there is disclosed an injection laser 90 in a cylindrical configuration. There is shown a center cylinder degeneratively doped P region 91 having a sheath or outer shell of insulation 92 mounted thereon. Mounted about this sheath of insulation is an outer cylinder 93 of a metal material. Forward biasing is provided by a voltage source 94 ohmically connected at points 96 and 97 to regions 93 and 91, respectively. An output from this device is shown leaving one of the opposed faces of the degeneratively doped P region 91. This device of FIG. 10 produces a laser output in a similar manner as described with reference to the device of FIG. 1. Injection of electrons from the metal 93 tunnels through the insulation region 92 and into the P region 91 to invert the population and, therefore, produce a lasering mode up and down the central axis of the cylindrical device 90 until such a time as there is a sufficient energy build-up to produce a laser output from face 95.

Referring now to FIG. 11, there is an injection laser 100 comprised of a P-type degeneratively doped region 101 in contact with an insulation region 102. The insulation region 102 is shown in contact with a metal region 103. Mounted on top of these regions are two dielectric regions 104 and 105. Biasing is provided by a voltage source 106 which is ohmically connected to region 103 at point, not shown, and to region 101 at point 107. This sandwich device 100 produces lasering via a tunneling mechanism which causes electrons, of a sufficiently high energy level, to leave the metal 103, tunnel through the insulation 102 and invert the population 101 of the degeneratively doped P region 101. In this manner, the condition for lasering is produced and an output signal is obtained from the degeneratively doped P region face 109.

Although no temperatures have ben specifically called for with regard to the operation of these devices, inasmuch as lasering is producible at 300° K. which is substantially equal to room temperature, it is generally thought that significantly better operation of semiconductor lasers would be obtained by operating these devices at a temperature of substantially 77° K. This temperature can be produced by placing these devices in a cavity which is refrigerated to these lower temperatures.

In spite of the fact that these devices of this invention have been disclosed utilizing primarily degeneratively doped P-type material, it is entirely conceivable that the devices disclosed herein could be formed of a degeneratively doped N-type material region, such as gallium arsenide doped with an N-type impurity, such as phosphorous, arsenic or antimony and holes can be quantum-mechanically tunneled through an insulation region or directly into a degeneratively doped N-type region from a suitable provider of holes, such as a metal of the type V periodic classification of the chemical elements and could include metals, such as cobalt, tantalum or possible metal of the V–I periodic classification, such as chromium, molybdenum and tungstun.

It can be appreciated that the specific embodiments described are merely illustrative of the general principles of the invention. Various other modifications may be devised without departing from the spirit and scope of the invention.

We claim:

1. A semiconductor laser comprising a sandwich including a body of degeneratively doped semiconductor material having side surfaces and opposed end surfaces,
   a pair of thin metal films overlying opposed side surfaces of said body,
   a pair of layers of insulating material interposed between said body and respective metal films,
   electrical circuit means for connecting said metal films and said body to a source of forward bias voltage for causing electrons from the metal films to tunnel through the insulation into said body and to produce photons of energy within the body,
   internal reflection enhancing means in contact with the uncovered side surfaces of the body,
   and means on the end surfaces of said body for enhancing internal reflection of photons and for subsequent exit of photons from the body.

2. A semiconductor laser as set forth in claim 1 wherein said internal reflection enhancing means comprises a number of superimposed layers of dielectric material, the layer nearest the body being a low index of refraction material and the remaining layers being alternately of high and low index of refraction respectively.

3. A semiconductor laser as set forth in claim 1 wherein the electron affinity of the semiconductor material of the body is lower than the work function of the metal film.

4. A semiconductor laser as set forth in claim 1 wherein the metal film has a work function lower than the electron affinity of the semiconductor material of said body.

5. A semiconductor laser comprising a sandwich including a body of degeneratively doped semiconductor material having side surfaces and opposed end surfaces,
   a pair of thin metal films overlying opposed side surfaces of said body,
   a pair of layers of insulating material interposed between said body and respective metal films,
   a third thin metal film completely covering the side surfaces of the body and interposed between the body and said insulating layers,
   electrical circuit means for connecting said pair of metal films and said third metal film to a source of forward bias voltage for causing electrons from said pair of metal films to tunnel into said body to produce photons of energy within the body,
   and means on the end surfaces of said body for enhancing internal reflection of photons and subsequent exit of photons from the body.

6. A semiconductor laser as set forth in claim 5 wherein said semiconductor body is doped with a p-type impurity.

7. A semiconductor laser as set forth in claim 5 wherein said semiconductor body is p-type gallium arsenide having a Fermi level below its valence band.

8. A semiconductor laser as set forth in claim 5 wherein said pair of layers of insulating material are oxides of the metal of the adjacent pair of metal films.

References Cited

UNITED STATES PATENTS 3,204,159   8/1965   Bramley et al. _____ 317—238

OTHER REFERENCES

Hall et al.: "Coherent Light Emission From GaAs Junctions," physical Review Letters, vol. 9, No. 9, Nov. 1, 1962, pp. 366–368.

Anderson: "Radiation From GaAs Tunnel Diodes," Proceedings of the IEEE, vol. 51, No. 4, April 1963, p. 610.

Wang: "Proposal for a Two-Stage Semiconductor Laser Through Tunneling and Injection," Journal of Applied Physics, vol. 34, No. 12, December 1963, pp. 3443–3450.

JEWELL H. PEDERSEN, *Primary Examiner.*

RONALD L. WIBERT, *Examiner.*